(12) United States Patent
Kuehnel et al.

(10) Patent No.: US 7,600,113 B2
(45) Date of Patent: Oct. 6, 2009

(54) SECURE NETWORK CHANNEL

(75) Inventors: Thomas Kuehnel, Seattle, WA (US); Shannon J. Chan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 632 days.

(21) Appl. No.: 10/783,524

(22) Filed: Feb. 20, 2004

(65) Prior Publication Data
US 2005/0188193 A1    Aug. 25, 2005

(51) Int. Cl.
H04L 29/06 (2006.01)
H04L 9/32 (2006.01)
G06F 7/04 (2006.01)
G06F 12/16 (2006.01)
G06F 15/173 (2006.01)
G06F 15/16 (2006.01)
G06F 9/44 (2006.01)

(52) U.S. Cl. ........................ 713/155; 713/156; 713/161; 713/168; 713/175; 726/3; 726/10; 726/22; 709/224; 709/225; 709/228; 709/229; 719/328

(58) Field of Classification Search .................. 713/163
See application file for complete search history.

(56) References Cited

U.S. PATENT DOCUMENTS

| | | | | |
|---|---|---|---|---|
| 6,856,800 B1 * | 2/2005 | Henry et al. | ................. | 455/411 |
| 6,865,673 B1 * | 3/2005 | Nessett et al. | ................ | 713/155 |
| 7,069,587 B2 * | 6/2006 | Ito | ............................... | 726/17 |
| 7,089,298 B2 * | 8/2006 | Nyman et al. | ................ | 709/220 |
| 7,143,297 B2 * | 11/2006 | Buchheit et al. | ............. | 713/193 |
| 7,240,369 B2 * | 7/2007 | Chou et al. | .................... | 726/27 |
| 2004/0030923 A1 * | 2/2004 | Tindal et al. | ................. | 713/201 |
| 2004/0117661 A1 * | 6/2004 | Karaoguz et al. | ........... | 713/201 |
| 2005/0041808 A1 * | 2/2005 | He | ............................... | 380/248 |
| 2005/0125663 A1 * | 6/2005 | Funk | ........................... | 713/168 |
| 2005/0149723 A1 * | 7/2005 | Watkins et al. | .............. | 713/156 |
| 2006/0020784 A1 * | 1/2006 | Jonker et al. | ................. | 713/157 |
| 2006/0037036 A1 * | 2/2006 | Min et al. | ....................... | 725/1 |

FOREIGN PATENT DOCUMENTS

| WO | WO 02065696 A1 | * | 8/2002 |
|---|---|---|---|
| WO | WO 03049365 A1 | * | 6/2003 |
| WO | WO 03091858 A2 | * | 11/2003 |
| WO | WO 2004027588 A2 | * | 4/2004 |

OTHER PUBLICATIONS

Grimm et al, System Support for Pervasive Applications, 2004, ACM, pp. 421-486.*

(Continued)

*Primary Examiner*—Christopher A Revak
*Assistant Examiner*—Aravind K Moorthy

(57) ABSTRACT

Methods and systems for establishing a secure network channel between two or more devices in a communication network are disclosed. In exemplary implementations the network may be a UPnP network. A first device passes authentication information to at least a second device to permit the second device to authenticate the first device. Optionally, the first device may request to authenticate the second device, in which authentication information associated with the second device is passed to the first device. The first device uses this information to authenticate the second device. At least one of the first and second device may store authentication information in an data store associated with the device.

18 Claims, 13 Drawing Sheets

OTHER PUBLICATIONS

Edwards et al, Experiences with Recombinant Computing: Exploring Ad Hoc Interoperability in Evolving Digital Networks, 2009, ACM, pp. 1-44.*

Miller et al, Home Networking with Universal Plug and Play, 2001, IEEE, pp. 104-109.*

* cited by examiner

| Control 208 | Eventing 210 | Presentation 212 |
|---|---|---|
| Description 206 | | |
| Discovery 204 | | |
| Addressing 202 | | |

Fig. 2

SECURE NETWORK CHANNEL

TECHNICAL FIELD

The described subject matter relates to electronic computing, and more particularly to establishing a secure network channel in a communication network.

BACKGROUND

Universal Plug and Play (UPnP) provides a network architecture that facilitates adding and removing devices from a network. For instance, the UPnP architecture allows a user to simply "plug" a new device into a network coupling, and thereafter the network will automatically determine the characteristics of the new device and subsequently coordinate interaction between this new device and others in the network based on the determined characteristics. The UPnP architecture is particularly well suited for networks associated with a local setting, such as a home, a business, a school, etc. The term "Universal Plug and Play" derives from functionality provided in the earlier developed device Plug and Play (PnP) device. PnP provides a flexible technique for automatically adding and removing peripherals to a standalone computer device, such as a PC.

UPnP devices are commonly used in relatively localized network environments, such as in a home or business. In the home environment, for instance, a network built in accordance with the UPnP architecture may interconnect a collection of media source devices and a collection of media rendering devices. An exemplary media source device might comprise a personal computer that stores a collection of music, video, pictures, etc., or may comprise various types of jukebox devices. An exemplary media rendering device might comprise a TV, stereo, personal computer, and so on. A control point (such as a personal computer) can then be used to route resource information from one of the media source devices to a selected media rendering device.

However, existing networks that include UPnP devices do not perform the above-described transfer of resource information in a well-controlled, secure, and responsible fashion. For instance, there exists the risk that an individual that is not affiliated with the network including UPnP devices might tap into the network in an unauthorized manner. For instance, the network may be implemented using wireless links (in whole or in part). In these networks, there exists the risk that an unauthorized individual might intentionally or inadvertently gain access to the resources provided by the UPnP architecture. Similar risks are present in other kinds of networks. Further, the functionality provided for networks that include UPnP devices is designed to ensure continuity with wide area IP network functionality. While this provides many advantages, it also introduces the risk that users in the wide area network environment might intentionally or inadvertently find a way to tap into the home network environment. Since the UPnP architecture does not provide a suitable mechanism for controlling or blocking the routing of information, there is a chance that these kinds of unauthorized users might gain access to the network's entire collection of media and informational resources or control the UPnP devices on the network.

Accordingly, there is a need in the art for a technique for securing channels in a communication network, such as a network including UPnP devices.

SUMMARY

Described herein are methods and systems for establishing a secure communication channel in a network. In exemplary implementations, a secure communication channel is established between a UPnP device and a UPnP control point. In alternate implementations, information used to establish the secure communication channel between a UPnP device and a UPnP control point may be used to establish a secure communication channel between other devices in the network. The systems and methods are generally applicable to communication networks other than UPnP networks.

BRIEF DESCRIPTION OF THE DRAWINGS

FIG. 2 is a schematic illustration of a series of functions provided by the UPnP architecture.

DETAILED DESCRIPTION

Described herein are exemplary systems and methods for securing a channel in a communication network. The methods described herein may be embodied as logic instructions on one or more computer-readable media. When executed on a processor, the logic instructions cause a general purpose computing device to be programmed as a special-purpose machine that implements the described methods. The processor, when configured by the logic instructions to execute the methods recited herein, constitutes structure for performing the described methods. In alternate embodiments the logic instructions may be embodied as firmware or hardwired into electronic circuitry.

UPnP Network Architecture

Figure 1:
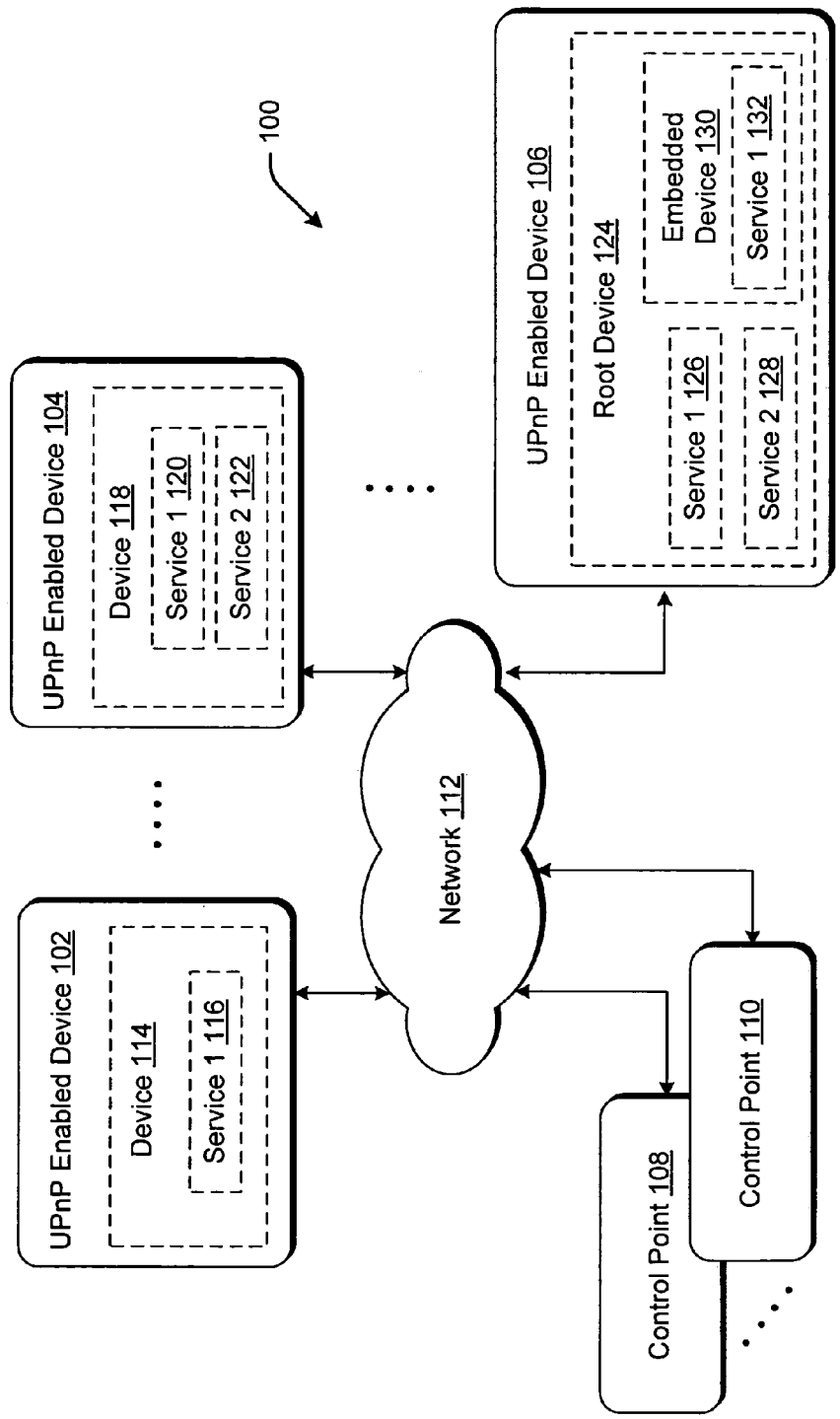
FIG. 1 is a schematic illustration of a conventional UPnP network architecture.

FIG. 1 is a schematic illustration of a conventional UPnP network architecture 100. By way of overview, a UPnP architecture 100 includes a plurality of devices (e.g., devices 102, 104, and 106) and control points (e.g., control points 108 and 110) coupled together via a communication network 112.

The UPnP devices (102, 104, and 106) can include a variety of media rendering devices. Exemplary devices include computers of all types, CD/DVD players/jukeboxes, TVs, VCRs, MP3 players, stereo systems, electronic picture frames (EPFs), various types of still and video cameras, and so on. More specifically, a so-called UPnP device conceptually defines a container that can include actual devices, services, etc. A service, in turn, defines various functions performed by an UPnP device that are made available to other UPnP devices. For instance, one exemplary service might pertain to a chronological function provided by a clock. In general, a service models its functionality using state variables and exposes various actions associated with the model to other UPnP devices. In the exemplary case of FIG. 1, the UPnP device 102 includes a device 114 that provides a service 116. UPnP device 104 includes a device 118 that provides services 120 and 122. UPnP device 106 includes a root device 124 that provides services 126 and 128. The root device 124, in turn, includes an embedded device 130 that provides a service 132.

The communication network 112 can couple the devices (102, 104, 106) together using the Transmission Control Protocol and the Internet Protocol (TCP/IP). The network 112 can also freely draw from a number of other standard protocols, such as Hypertext Transfer Protocol (HTTP), Simple Object Access Protocol (SOAP), General Event Notification Architecture (GENA), and so on. The network 112 can be physically implemented using a variety of hardwired and/or wireless communication mechanisms, such as phone lines, power lines, Infrared Data Association (IrDa), Ethernet, Radio Frequency (RF) coupling, and so on.

The control points (108, 110) define agents that can discover and control other UPnP devices. In an exemplary implementation a control point may be embodied as, e.g., a media server, which may be implemented using one or more types of computers, application-specific logic modules, etc. A UPnP device may include one or more control points integrated therewith.

UPnP Network Operations

FIG. 2 illustrates conventional functions performed by the UPnP architecture 100 arranged in hierarchical layers. An addressing function 202 pertains to procedures whereby devices and control points receive addresses to interact with the network 112. More specifically, a device or control point can receive an address from a Dynamic Host Configuration Protocol (DHCP) server or using an Auto IP assignment procedure (e.g., if no DHCP server is available). The Auto IP procedure provides a technique for intelligently selecting an IP address from a set of private reserved addresses.

A discovery function 204 pertains to procedures whereby devices advertise their services to control points. Devices can perform this advertisement by sending out a multicast variant of HTTP (i.e., HTTP-MU). A control point subsequently responds using HTTPU (i.e., a unicast variant of HTTP). The discovery function 204 makes use of General Event Notification Architecture (GENA) and Simple Device Discovery Protocol (SSDP) to carry out the above-noted exchange between UPnP devices and control points. Further, a newly added control point can also search for UPnP devices and services coupled to the network.

A description function 206 pertains to a procedure whereby a control point that has discovered a UPnP device can determine more information regarding the UPnP device. The UPnP device responds by sending information to the control point, where such information is presented, using the extensible markup language (XML). Such information defines details regarding the type of UPnP device (e.g., manufacturer, model name and number, serial number, etc.), the services it offers, uniform resource locators (URLs) for interacting with the device, and so on.

A control function 208 involves transmitting a control message from the control point to the UPnP device. The UPnP architecture 100 uses SOAP to transmit this message. SOAP messages contain action requests. The UPnP device executes the action specified in the SOAP message and then responds to the control point. The response contains action-specific values or fault codes.

An eventing function 210 pertains to a procedure whereby a control point monitors events associated with services provided by the UPnP architecture 100. More specifically, a service can send an event when its model changes state. The process of "publishing" these state changes is referred to as eventing. The control point can subscribe to receive various events by sending a subscription message to a service of interest.

Finally, a presentation function 212 entails retrieving a page of information from a UPnP device using a presentation URL associated with this UPnP device. The control point can initiate the presentation process by issuing an HTTP GET request to the UPnP device. The presentation function 212 allows a user to view the status of the device and/or control the device.

The UPnP Forum's web site (i.e., http://upnp.org/) provides more detailed information regarding the UPnP architecture and related topics.

Referring again to FIG. 1, described herein are techniques for establishing a secure channel between a UPnP device 102, 104 and a UPnP control point 108, 110. Following the UPnP discovery function, a UPnP device and a control point mutually authenticate and exchange keys using a security protocol such as, e.g., the Transport Layer Security Protocol (TLS). The particular encryption algorithms may be negotiated as part of the TLS message exchange. Subsequent UPnP actions, such as description, control, eventing, and presentation actions use HTTPS to access the respective URLs. The authentication applies to all UPnP actions (i.e., all URLs pertaining to description, control, eventing, and presentation) between the authenticated pair of device and CP. The authentication information may be cached and may remain valid as long as the device is associated with the control point.

The authentication processes described herein may use either a shared master key or public key infrastructure (PKI) techniques. The shared master key uses a long number (typically at least a 64 bit number) transferred out of band between a device and a control point. A session key is generated from the shared master key. There are various ways to convey this information out of band, including, e.g., requiring the user to enter a number at the device and/or the control point, establishing a temporary physical connection (e.g., via a cable) between the device and the control point, or transferring the shared master key via a USB memory stick or other hardware device that can be connected sequentially to the device and the control point.

Public key infrastructure is typically used for the secure transactions on public communication networks such as, e.g., the internet, in which communicating entities are not known to each other. In application, the device and the control point contain a pair of public and private keys, based on which a master session key is generated. A certificate from a trusted party (e.g., a certificate authority) is used to certify the device authenticity. Minimal user interaction is required to confirm the proper device.

Figure 3:
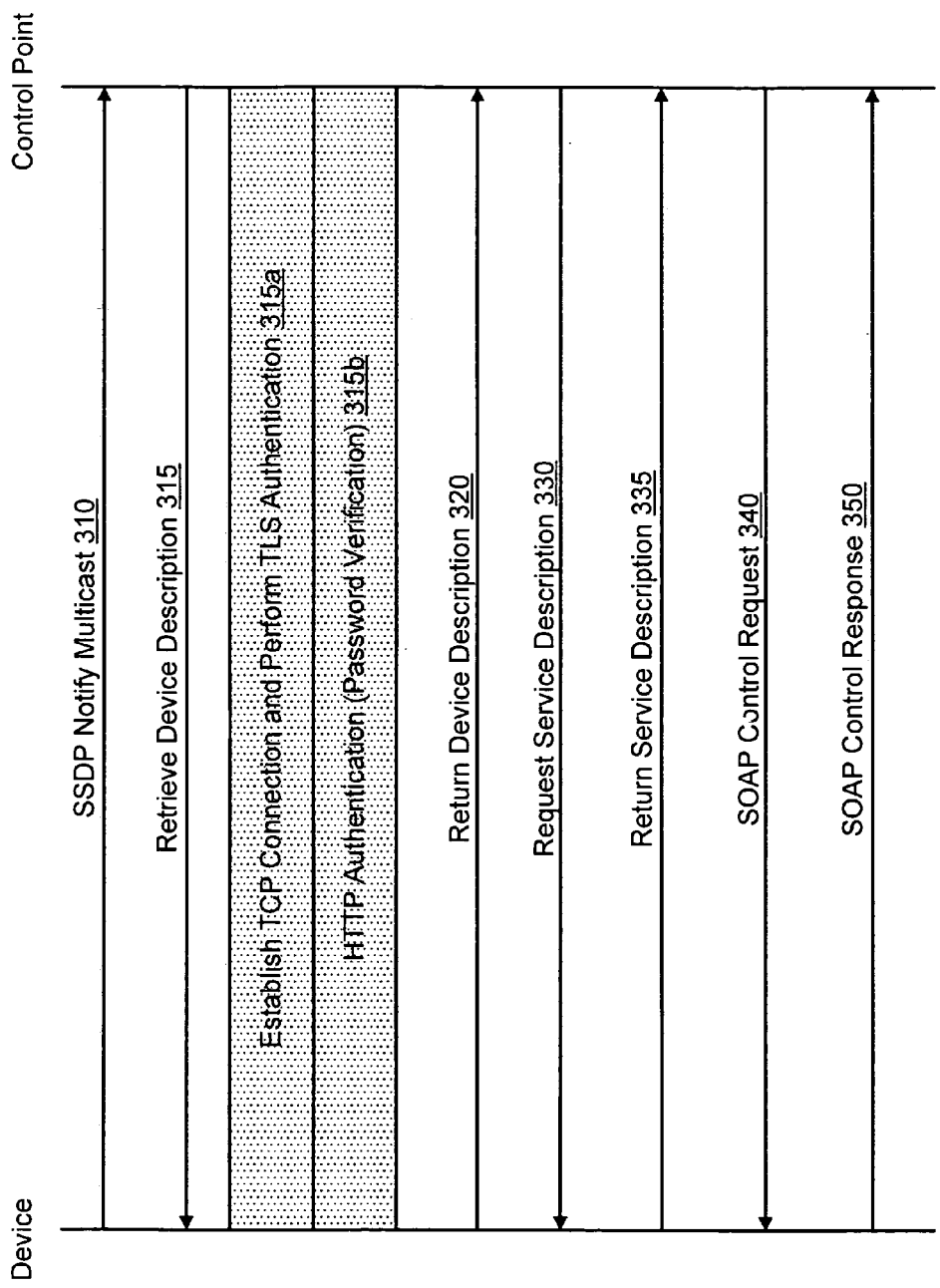
FIG. 3 is a diagram illustrating operations in an exemplary process for adding a new device to a UPnP network.

FIG. 3 is a diagram illustrating operations in an exemplary process for adding a new device to a UPnP network. As described above, after the device powers-up (or connects to the network) the device obtains an IP-address, e.g., via DHCP. Alternatively, if no DHCP Server is available, the device may select an IP address using Auto-IP. The device then multicasts a sequence of SSDP NOTIFY messages to the well-known SSDP address and port (239.255.255.250:1900) to advertise its device type, composition, and services. The sequence of SSDP notify messages contains the location URL for the root device.

At operation 315 the control point retrieves the device description according to the URLs contained in the SSDP multicast advertisements using, e.g., an HTTP request. When the description page is retrieved, an authentication process is invoked to establish a secure connection between the device and the control point. In an exemplary implementation, the authentication process includes at least one of a TLS authentication process 315a, and an HTTP authentication process 315b. Details of these authentication processes are discussed below.

At operation 320 the device returns the device description to the control point. In an exemplary implementation the device description includes details of the device such as, e.g., model type, name, serial number, and services offered by the device. If the device desires a secure channel for communication with the control point, then the location URL for the root device starts with HTTPS, rather than HTTP. The TLS parameters are cached and remain active for the duration of the session and reused for other connections belonging to the same session.

At operation 330 the control point requests a service description from the device, e.g., by issuing an HTTPS Get Service URL inquiry. The service description is retrieved using the cached TLS session parameters. At operation 335 the device returns the service description, again using the cached TLS session parameters.

At operation 340 the control point issues a SOAP control request to the device, and at operation 350 the device sends a response to the control point.

Figure 4:
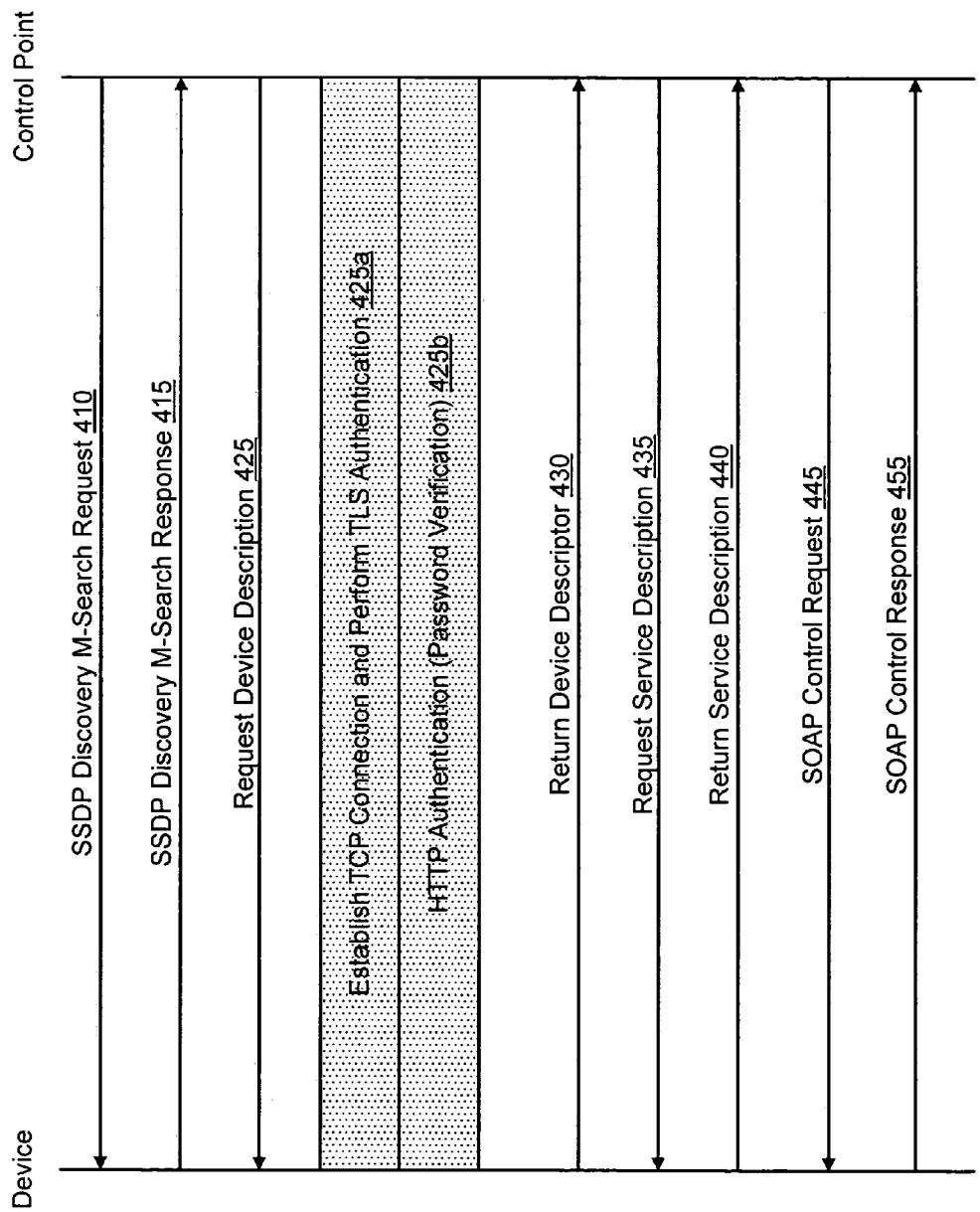
FIG. 4 is a diagram illustrating operations in an exemplary process for adding a control point device to a UPnP network.

FIG. 4 is a diagram illustrating operations in an exemplary process for adding a control point device to a UPnP network. At operation 410 the control point sends a SSDP search multicast to the well known SSDP address. The device responds (operation 415) to the multicast and provides the location URL of the root device. At operation 425 the control point requests the device description. If a secure communication channel is desired, then the control point uses HTTPS (rather than HTTP) to reference the URL description page. The HTTPS request triggers an authentication process to establish a secure connection between the device and the control point. In an exemplary implementation, the authentication process includes at least one of a TLS authentication process 425a and an HTTP authentication process 425b. Details of these authentication processes are discussed below.

At operation 430 the device returns the service description to the control point over the secure channel. At operation 435 the control point requests a service description from the device, and at operation 440 the device returns the service description. At operation 445 the control point issues a SOAP control request to the device, and at operation 455 the device sends a response to the control point.

Secure UpNP Protocol

Figure 5:
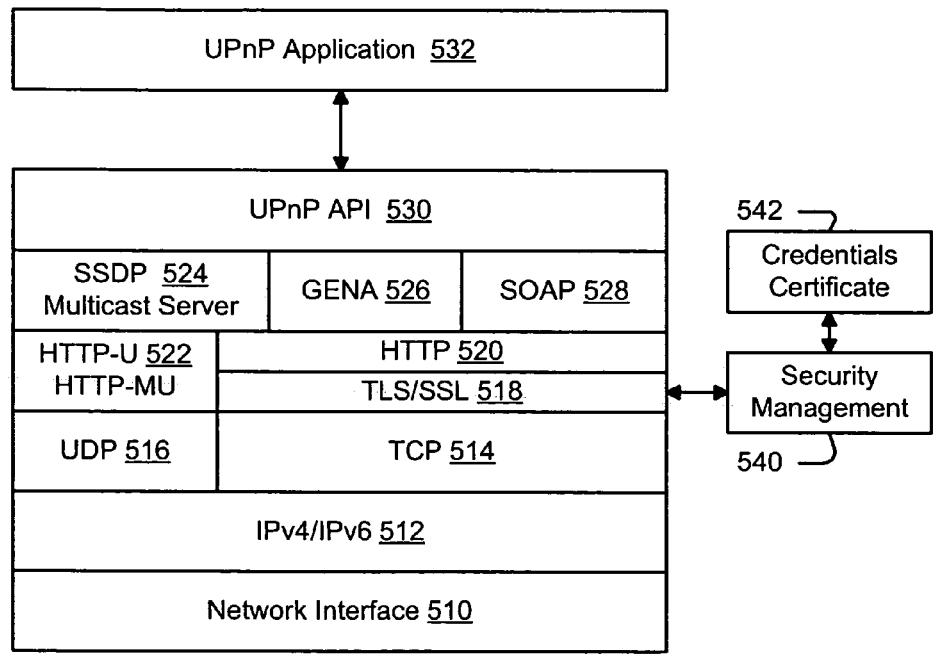
FIG. 5 is a schematic illustration of an exemplary protocol stack for a UPnP device that implements a secure channel.

FIG. 5 is a schematic illustration of an exemplary protocol stack for a UPnP device that implements a secure channel. The protocol stack is conventional; with the exception of the introduction of a TLS/SSL layer 518 between the TCP layer 514 and HTTP layer 520. The TLS layer implements a security management function 540 that may be utilize on or more credentials certificates 542. Details of the security management function 540 implemented by the TLS/SSL layer 518 are described in greater detail below.

In brief, the protocol stack includes a network interface layer 510, an IP layer 512, and a TCP layer 514 and a UDP layer 516 above the IP layer. An HTTP-U/HTTP-MU layer resides above the UDP layer 516, while the TSL/SSL layer 518 is interposed between the TCP layer 514 and the HTTP layer 520. Three protocols are provided above the HTTP layer: an SSDP layer 524, a GENA layer 526, and a SOAP layer 528. A UPnP API 530 provides an interface to a UPnP application 532.

Authentication Operations

Overview

Figure 6:
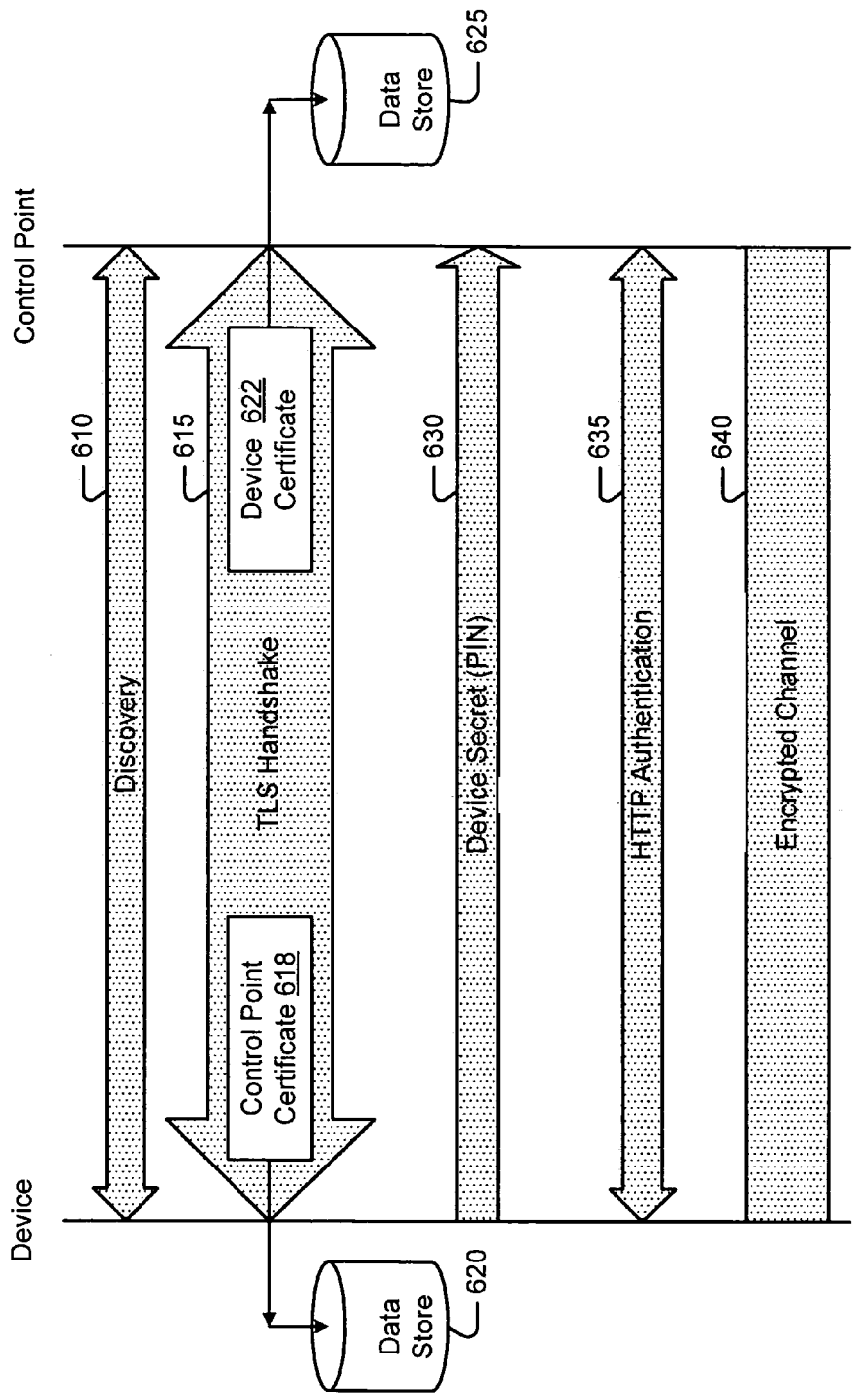
FIG. 6 is a diagram illustrating operations in an exemplary authentication process.

FIG. 6 is a diagram illustrating an overview of operations in an exemplary authentication process between a UPnP device and a UPnP control point. Operation 610 represents the discovery process, which is described above with reference to FIGS. 3-4. After discovery, the security management function 540 of the TLS/SSL layer 518 implements a TLS handshake operation 615, which is described in detail in FIG. 7 and the accompanying text below. Additional information about implementing a TLS handshake is available on the world-wide-web in RFC 2246: The TLS Protocol, Version 1.0. During the TLS handshake operations certificates are exchanged and session keys are negotiated. The device forwards a device certificate 622 to the control point, and the control point authenticates the device by comparing the signature on the certificate to certificates on file in the data store 625. Optionally, the control point forwards a certificate to the device, and if the signature of the control point certificate 618 matches a signature on file in the data store 620, then authentication may be considered complete and no further action is required.

By contrast, if the device is unable to verify the control point certificate 622, then the device may invoke an HTTP authentication request. At operation 630 a device secret such as, e.g., a PIN number is transmitted to the control point. The secret comprises two parts, the PIN itself and a hash of the certificate sent to the CP. An HTTP authentication procedure 635 is invoked to authenticate the control point. If the authentication procedure 635 is successful, then the control point certificate 618 presented to the device may be stored persistently at the data store 620. The next time no user interaction is required as the certificate can be easily matched. Following authentication an encrypted channel is established, at operation 640. The authentication process is described in greater detail below, with reference to FIG. 7.

TLS/SSL Handshake

Figure 7:
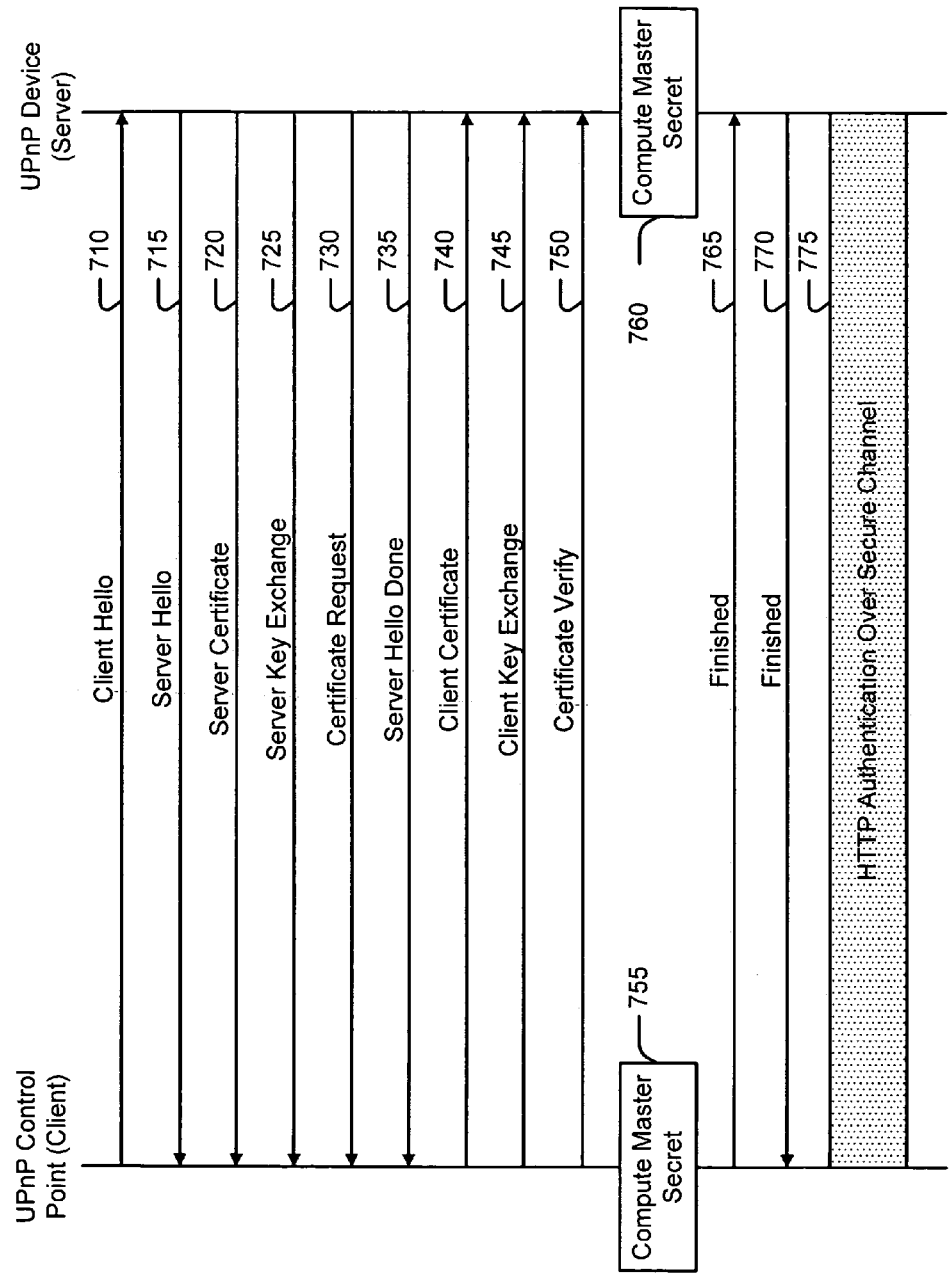
FIG. 7 is a diagram illustrating operations in an exemplary authentication handshake process.

FIG. 7 is a diagram illustrating operations in an exemplary authentication handshake process such as, e.g., the TLS handshake process 615. This process establishes a trust relationship between a device and a control point. While the device may be authenticated using its certificate information that is stored on the device, the control point is authenticated using a shared secret. In one implementation a shared secret requires user interaction with the control point, e.g., the user has to enter a unique PIN number that is associated with the device. In an alternate implementation, a private (out-of-band) communication channel may be set up by other means.

In an exemplary implementation authentication and negotiation of the cipher suite is based on the TLS protocol, which is described in detail in RFC2246, The TLS Protocol, Version 1.0, the disclosure of which is incorporated by reference herein. The UPnP control point communicates with the UPnP device in a client-server relationship. At operation 710 the UPnP client transmits a ClientHello message to the UPnP device. The message includes the Protocol Version, a data structure with a 28 Byte random value, a Session ID, a list of cipher suites (e.g., RSA with RC4 and MD5; DH with DSS, 3DES and SHA), and a list of supported compression methods. The Session ID identifies the connection between the device and the UPnP control point. It is empty for a new connection.

At operation 715 the device returns a ServerHello message to the control point. The message includes the cipher suite and compression method selected from the list received in the ClientHello, a random number generated by the device and a Session ID. If the Session ID in the ClientHello message can be matched to an existing Session ID, then the matching Session ID is returned to the control point, and both CP and device proceed to transmitting finished messages at operations 765 and 770. By contrast, if the Session ID can not be matched or was empty, a new Session ID is generated and returned to the control point.

At operation 720 the device sends a certificate (e.g., an X.509v3 certificate or a chain of X.509v3 certificates) following the ServerHello message. The certificate contains a key that matches the agreed key exchange mechanism that is negotiated as part of the cipher suites. At operation 725 the device sends a server key exchange message that includes one or more server parameters and a signature. This message is sent only for some key exchange methods for which the certificate does not contain enough information to establish a pre-master secret. The RSA key exchange method does not require this message.

At operation 730 the device may send a certificate request to the UPnP control point. The request contains a list of certificate types and acceptable certification authorities. At operation 735 the UPnP device sends a ServerHello Done message to the control point. This message indicates the end of the ServerHello message exchange.

At operation 740 the UPnP control point forwards a certificate (e.g., an X.509v3 certificate or a chain of X.509v3 certificates) to the UPnP device. At operation 745 the UPnP control point transmits a client key exchange message to the UPnP device. The message includes the pre-master secret, 48 byte structure of random number and version is with the public key from the received certificate and sent to the device. The message format (e.g., RSA, Diffie Hellman) depends on the key exchange method implemented. At operation 750 the UPnP control point sends a certificate verify message to the UPnP device. This message explicitly verifies the certificate sent by the control point. The concatenation of all exchanged handshake messages not including this message is signed using, e.g., MD5 or SHA hash functions.

At operations 755 and 760 the UPnP control point and the UPnP device compute their respective master secrets. In an exemplary implementation the device uses its private key to decrypt the pre-master secret transmitted in operation 745. The control point and the device each convert their pre-master secret into the master secret. Following successful handshake operations all data that are exchanged between the device and the control point via HTTPS are encrypted using the selected encryption algorithm.

At operations 765 and 770 finished messages are exchanged for verification of key exchange and authentication. The finished messages are protected by the negotiated keys and algorithms. The concatenation of all exchanged handshake messages not including this message is signed using MD5 or SHA hash functions.

Device Authentication

Device authentication uses public key infrastructure (PKI) authentication. PKI relies on a public/private key pair that is unique to the device. The private key is never revealed to the outside. The public key of the device is part of the device certificate. Depending on the level of security required, the certificate can be issued by a trusted certificate authority, part of a certificate chain, with the root element issued by a trusted certificate authority, or be a self-signed certificate. The control point verifies the certificate sent by the device using the public key of the configured certificates.

Control Point Authentication

In an exemplary implementation the control point is authenticated using a certificate or credentials entered by a user. Exemplary credentials may include a password/PIN combination that the device matches with values in a data store. If the device requires control point authentication, then the device may request PIN/password authentication from the control point, e.g., using the format and protocol defined in RFC 2617: HTTP Basic and Digest Access Authentication, the disclosure of which is hereby incorporated by reference. Since there is already an encrypted channel between the device and the control point, HTTP basic authentication suffices. However, HTTP digest authentication is advantageous because the original PIN/Password is never sent over the wire. In addition, the device can implement features that make attacks more difficult, i.e., the number of wrong password entries can be limited.

The first URL containing HTTPS received by the control point triggers the TLS handshake operations, returns an unauthorized status code (e.g., 401), and includes a WWW authenticate header field that contains the authentication method (i.e., basic or digest) and a challenge. When HTTP basic authentication is used, the control point responds with the credentials as base64 encoded concatenation of user name, column, and password. The user may enter the credentials manually or by alternate means. The format of the credentials is at the discretion of the device implementer. For example, the username (login) can be omitted and the number of retries can be limited or combined with a timeout to limit the vulnerability to brute force attacks.

The PIN/password combination may be used to authenticate the control point based on a secret known to the device. In addition, the PIN/password combination may be used to verify the device certificate based on a hash of the certificate information. The length of the PIN/password combination is a trade off between vulnerability (i.e., security) and convenience (i.e., usability). Since control point user interfaces may have limited input capabilities and limited support for character sets (i.e., single button, numeric, full alphanumeric, etc.), the PIN should be limited, e.g., to numeric values.

An ideal PIN should have 100 or more random digits that follow predetermined rules that make guessing of the PIN more difficult. Since a long PIN is user unfriendly if manually conveyed, shorter PINs are typically deployed. The PIN number is known to the device and should be conveyed out of band to the control point. In an exemplary implementation the PIN may be displayed on a sticker on the device, in a manual associated with the device, or on a GUI associated with the device. Alternatively, a memory device such as, e.g., a flash memory may be used to convey the PIN between a device and a control point.

Figure 8:
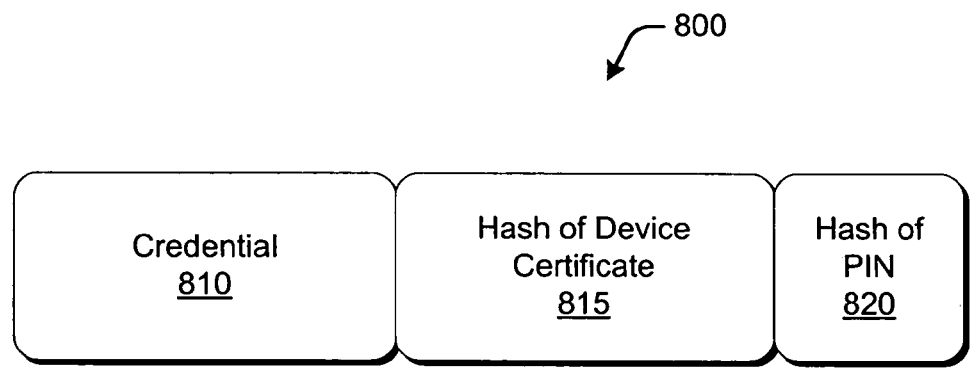
FIG. 8 is a schematic illustration of an exemplary PIN.

FIG. 8 is a schematic illustration of an exemplary PIN 800. Referring to FIG. 8 an exemplary PIN 800 includes a credential (i.e., a secret) 810 and a hash of the certificate 815 sent by the device. The hash 815 that is part of the PIN is verified by the control point if it matches the computed hash of the certificate sent by the device. In the hash does not match, then the control point may indicate an error to the user and does not forward the PIN to the device. Optionally, a hash of the PIN 820 can be appended to catch typing errors.

If a device and a control point have a secure relationship by design then no user interaction is required. Instead, the device and the control point authenticate each other automatically using pre-existing certificates. This is the case when a manufacturer packages a device and a control point (e.g., an UPnP stereo and its UPnP speakers) together.

Automatic authentication can be accomplished by matching certificates at the device and the control point. During TLS negotiation the device and control point exchange their respective certificates, which are compared with a stored list of trustworthy devices and control points, respectively. If there is a match, then no further authentication operations are required. The PIN or/and the certificate sent by the control point can be stored in a persistent manner following initial successful authentication.

Certificates

In an exemplary implementation certificates are used during TLS authentication to certify the identity of the device and the control point. The certificate is unique to the device or control point, and contains information pertinent to the specific device or control point, including its public key. Certificates may be issued by a trusted authority or a delegate. If there is not the strong requirement to establish a unique identity, then self signed (issued) certificates can be used. The format of the certificate may follow the common X.509v3 standard, as depicted in Table 1, below.

TABLE 1

| Type | Element | Usage | Example |
|---|---|---|---|
| Basic Elements | Version | TLS | 3 |
| | Certificate Serial Number | | 1234567 |
| | Signature Algorithm ID | | RSA |
| | Issuer | | Verisign |
| | Validity Period | | Nov. 09, 2001 - Jan. 07, 2015 |
| | Subject | | |
| | | Serial Number | 12131234234234. |
| | | Model Number | KX133-04. |
| | | Manufacturer (link) | factoryname.com |
| | Subject Public Key Information | | |
| | Issuer Unique Identifier | | |
| | Subject Unique Identifier | | |
| Extensions | Extension Type | Firmware Version | 00.310 |
| | Extension Value | | |
| Signature | Certification Authority's Digital Signature | | 5938f9908916cca32 |
| | | | 321916a184a6e7583 |

Certificates may be loaded along with the corresponding private key onto the device (or control point) during the manufacturing process or during initial setup. The control point must contain a certificate from the trusted root certificate authority since it holds the public key that is used to verify the signature for the root certificate that is part of the certificate chain passed to the control point. The control point may have certificates of its own to authenticate itself to the device for pre-authentication. The device may contain the chain of certificates necessary to verify its identity in addition to the private key that matches the issued certificate.

Certificate Management

Figure 9:
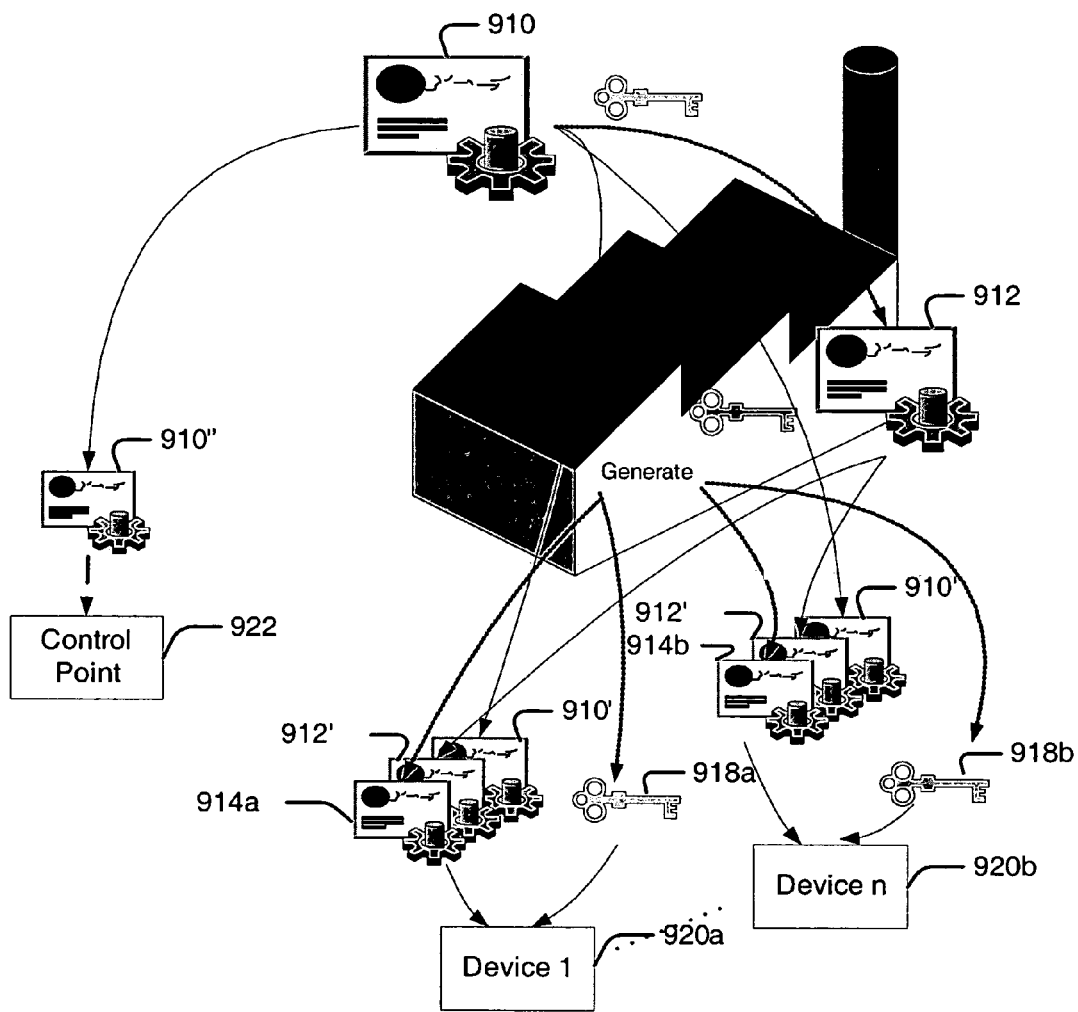
FIG. 9 is a schematic illustration of an exemplary certification hierarchy.

In an exemplary implementation trusted certificates are used in the authentication process. FIG. 9 is a schematic illustration of an exemplary certification hierarchy. A trusted root certification authority issues certificates, considered to be the root certificates 910. Since this scheme is not scalable, a hierarchy of certificate authorities may be established, with lower-tier certificate authorities issuing certificates to their respective clients. Lower-tier certificate authorities can also manufacture certificates. To verify a device certificate issued by a second or lower-tier certificate authority requires the chain of certificates including the root certificate. The root certificate verifies the certificate issued by the second-tier, which in turn verifies the certificate issued by the next lower tier until the device certificate is certified.

In application, during the manufacturing process of one or more devices 920a, 920b, etc., a private/public key pair is generated. The private keys 918a, 918b are stored in a suitable memory location on the respective devices 920a, 920b. The public keys become part of the device certificates 914a, 914b, which are signed by the manufacturer using the manufacturer's private key. The manufacturer certificate 912 is issued (i.e., signed) by the root certificate authority.

When device 920a is manufactured (or set-up), copies of the device certificate 914a, the manufacturer's certificate 912', and the root certificate 910' are stored in a suitable memory associated with the device 920a, thus creating a chain of certificates. Similarly, when device 920b is manufactured (or set-up), copies of the device certificate 914b, the manufacturer's certificate 912', and the root certificate 910' are stored in a suitable memory associated with the device 920b, thus creating a chain of certificates. The root certificate containing the public key of the root certificate authority is stored on the control point 922. This allows the control point 922 to verify the signature of the manufacturer's certificate 912 and, by implication, the chain of certificates that the respective devices present to the control point 922.

For pre-authenticated device and control point pairs, the control point is assigned its own certificate that indicates the type, manufacturer, and serial number. The device contains a list of valid, (i.e., pre-authenticated) control points. During the TLS handshake process the information presented in the control point's certificate is compared with the list of valid control points stored with the device. If there is a match between the certificate information and the data in the list, then a pre-authenticated device is assumed and no further user interaction is required.

Once a control point is authenticated successfully its information may be added to the list of pre-authenticated control points that are contained in the device.

In an alternate implementation certificates can be issued by a network device, which becomes the de-facto certification authority for the network. A device that is connected out of band signs the unique device certificate and copies the signed certificate together with its own root certificate onto the device and control point. The device may be implemented as a smartcard device or a personal computer that is plugged into an interface such as, e.g., a USB interface. In this event the signed certificate can be transferred via dedicated network cable, flash card or similar.

In another implementation the control point may not possess a certificate for authentication. In this case, HTTP authentication may be used to establish a trust relationship between a device and the control point. A PIN may be entered at the control point (or conveyed by other means). The control point may return a self-signed certificate to the device to facilitate pre-authentication. Following successful HTTP authentication, the self-signed certificate can be added to the list of trusted certificates.

In another implementation, self signed certificates can be used. The certificate and its corresponding private key can be loaded on the device. The control point uses hash authentication for the device. If the control point cannot find a valid root certificate or the certificate in its store, then it queries the user for the PIN. Since the PIN includes credentials and a hash of the certificate, it verifies the validity of the certificate. Once verified, the certificate may be stored in a data store associated with the control point. The PIN may also be stored in a data store associated with the control point to avoid having the user enter the PIN a second time during subsequent HTTP authentication. Processing self-signed certificates uses a certificate verification algorithm that includes the PIN query and hash certification.

Figure 10:
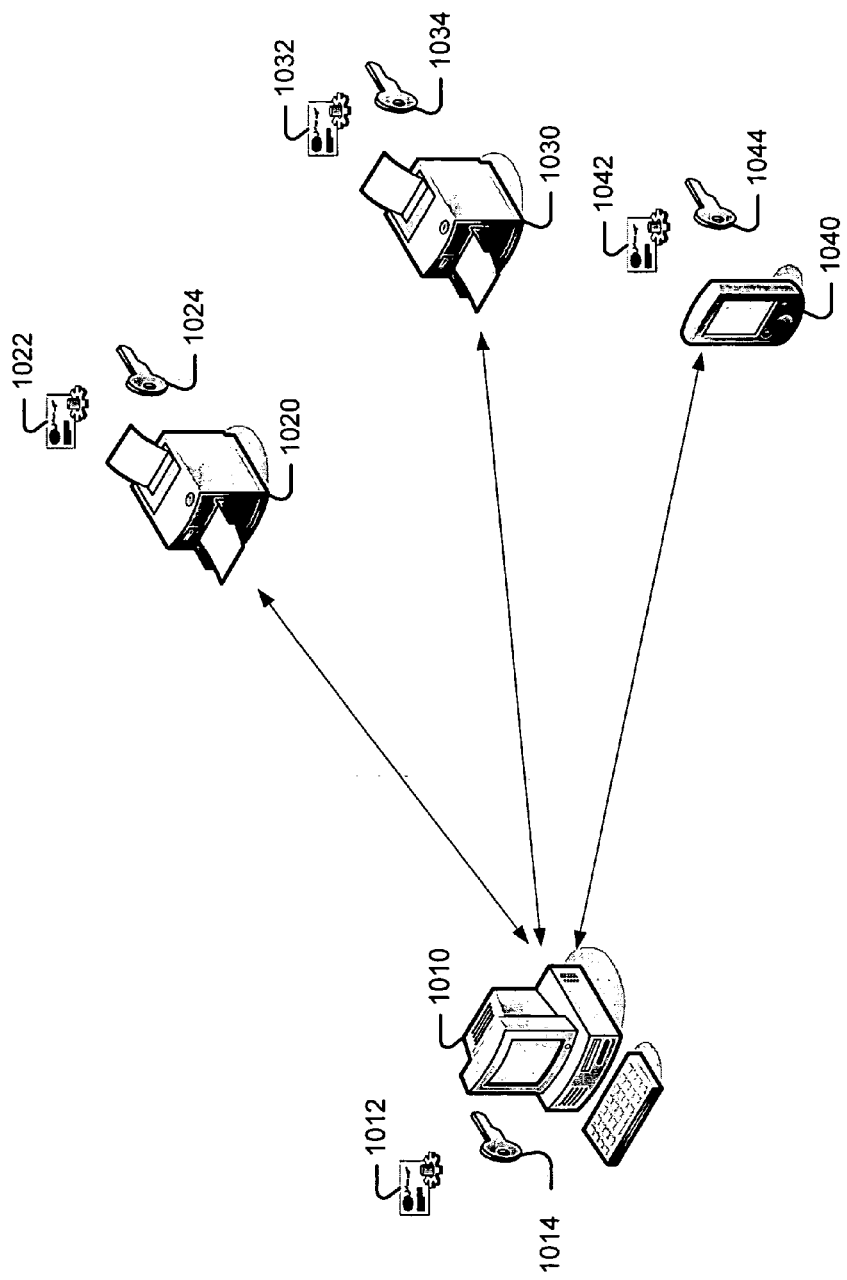
FIG. 10 is a schematic illustration of a key exchange procedure in which the public/private key pair is conveyed via flash memory.
Figure 11:
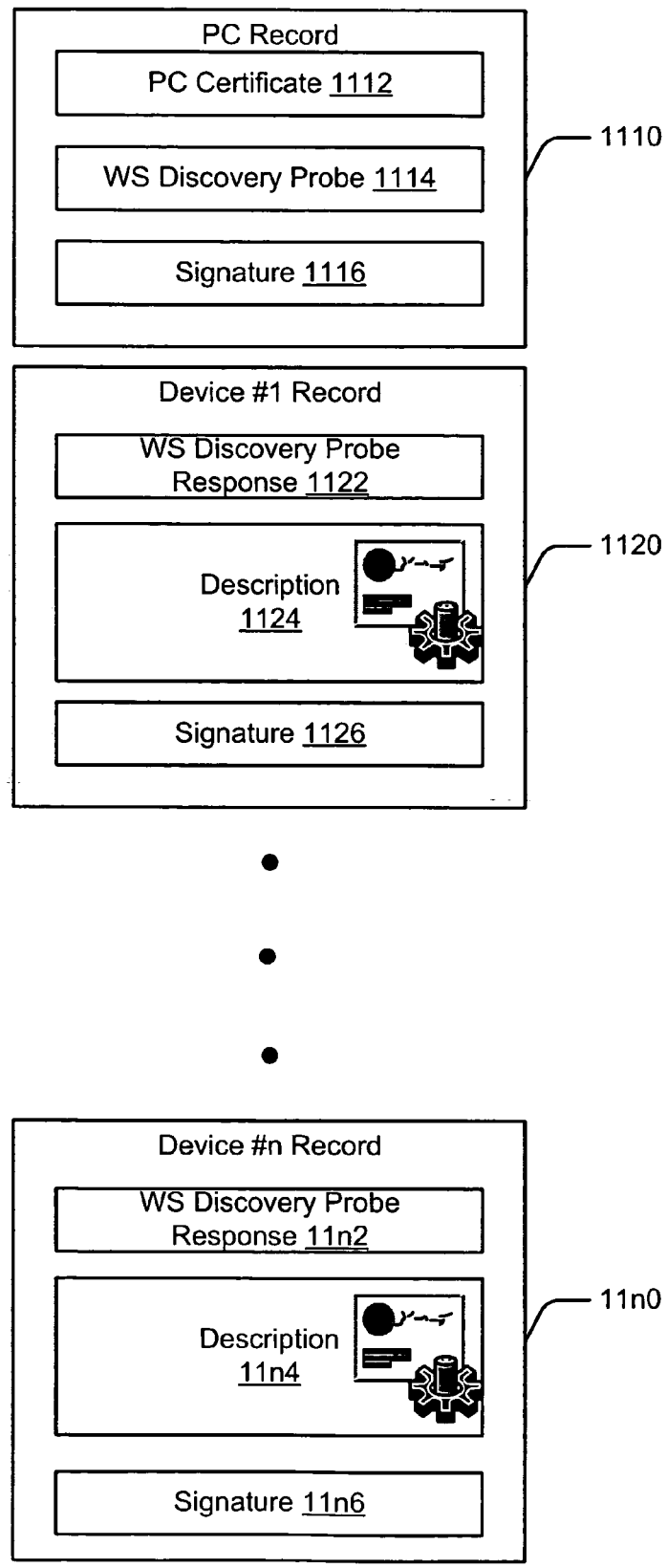
FIG. 11 is a schematic illustration of a key file format that may be used in the conveying the public/private key pair.

There are many other ways of creating and distributing certificates such as generating the certificate and the corresponding private key by a separate device, e.g., a PC. The key pair may be conveyed out of band, e.g., via flash memory, to the device and control point and thus resembling a shared key. FIG. 10 is a schematic illustration of a key exchange procedure in which the key pair is conveyed via flash memory, and FIG. 11 is a schematic illustration of a key file format that may be used in the conveying the public/private key pair. An exemplary authentication method will be explained with reference to FIGS. 10-11.

Referring to FIG. 10, assume a user wished to provide authentication between a personal computer 1010 and a plurality of devices such as, e.g., printers 1020, 1030 and a PDA 1040. Each of the devices and the PC include the infrastructure necessary to support public key encryption. More particularly, personal computer 1010 includes both a public key 1012 and a private key 1014. Similarly, printer 1020 includes both a public key 1022 and a private key 1024, printer 1030 includes both a public key 1032 and a private key 1034, and PDA 1040 includes both a public key 1042 and a private key 1044.

The user connects a USB flash memory to the personal computer 1010, e.g., via a USB port. An application executing on the personal computer 1010 writes the personal computer's certificate 1112 and the contents of a discovery request (i.e., a probe) 1114 to a record 1110 in a configuration file on the flash memory. An application executing on the personal computer 1010 computes a hash (e.g., SHA) over the entire record and generates a signature 1116 using the personal computer's private key. The discovery message has a unique message ID and may have a limited scope, e.g. printers.

The user then removes the USB flash memory from the personal computer and connects it to one of the remote devices such as, e.g., the printer 1020. An application executing on the printer reads the personal computer's record 1110 from the configuration file on the flash memory device, verifies it based on the signature 1116, and matches the discovery message with its own capabilities. If there is a match, then the printer 1020 stores the certificate from the personal computer 1010 in a suitable memory location (e.g., a certificate store). In addition, the printer 1020 generates a record 1120 in the flash configuration file and writes the contents of the corresponding discovery 1122 and a description to the flash configuration file. The printer 1020 computes a hash (SHA) over the record, signs it with its private key (RSA), and appends the signature 1126 to the record 1120 on the flash configuration file.

This process is repeated for each device (i.e., printer 1030, PDA 1040, etc.) the user wishes to authenticate with the personal computer 1010. Thus, the configuration file in the flash memory will have the PC record 1110 plus n additional entries, where n corresponds to the number of devices with which the PC is to be authenticated. In FIG. 11, the $n^{th}$ record is indicated with the character n, rather than a digit.

The user re-inserts the USB flash memory back into the personal computer 1010. An application on the personal computer reads the device discovery and description from the file, verifies them and places the embedded certificates into the trusted device certificate store. In an exemplary implementation the personal computer 1010 can use the device public key to verify that the record was signed by the owner of the device private key. The personal computer 1010 can then compute the hash of the device discovery and description and verifies that it matches the signed hash value. The subsequent TLS authentication matches the exchanged certificates with the ones in the respective certificate stores at the PC and the device.

Media Server Application

In another implementation the secure channel established between a UPnP control point and a UPnP device can be used to bootstrap a secure channel connection for a communication link between a UPnP A/V media server and a UPnP A/V media renderer. This approach is applicable if the communication protocol between a UPnP A/V media server and a UPnP A/V media renderer is based on HTTP Get for the media data.

Figure 13:
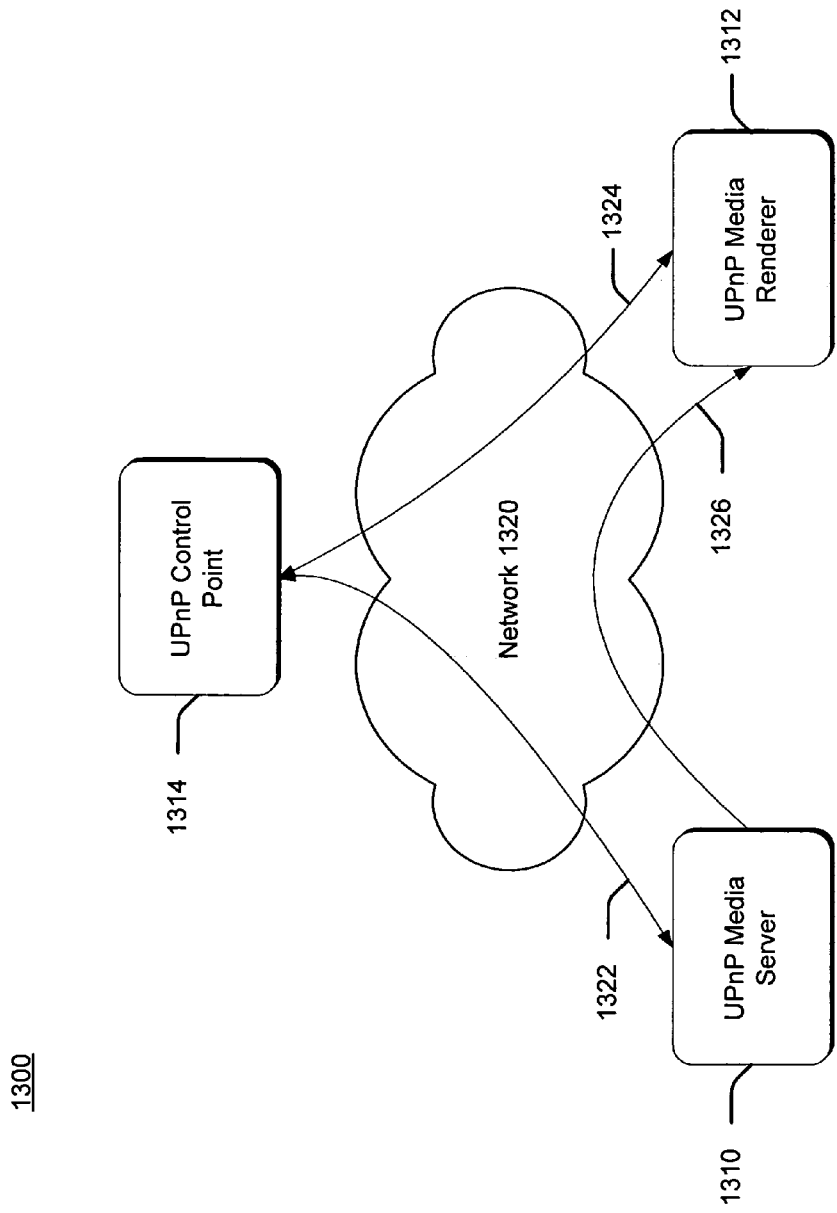
FIG. 13 is a schematic illustration of an exemplary UPnP AV network architecture.

FIG. 13 is a schematic illustration of an exemplary UPnP AV network architecture 1300. Referring to FIG. 13, network 1300 includes a UPnP media server 1310, a UPnP media renderer 1312, and one or more control points 1314 connected by a suitable communication network 1320. Exemplary media servers 1310 may include various types of computers or electronic media devices such as video cassette recorders (VCRs), digital video disk (DVD) players, compact disk (CD) players, radio tuners, television tuners, etc. Exemplary media rendering devices 1312 may include various types of computers, stereo systems, speakers, televisions, hand-held audio players, etc. Exemplary control points 1314 may be implemented using various types of computers, PDAs, application-specific logic modules, etc.

In the embodiment illustrated in FIG. 13 the control point 1314 is implemented as a separate device. In alternate embodiments the control point 1314 may be integrated with either the media server 1310, the media renderer 1312, or another UPnP device in the network 1300. If the control point is integrated with either the media server 1310 or the media renderer 1312, then only a single communication connection is needed.

In an exemplary implementation the communication network 1320 may be implemented as an IP network. However, the particular protocol suite implemented by the communication network 1320 is not critical.

In operation, a secure communication channel 1322 may be established between the media server 1310 and the control point 1314 using the techniques described above. Similarly, a secure communication channel 1324 may be established between the media renderer 1312 and the control point 1314 using the techniques described above. The secure channels 1322, 1324 may be used to convey session certificates pertaining. The control point can issue self-signed certificates or use certificates from a third party entity such as, e.g., the content owner.

When the secure connections are established the certificates are loaded to the media server 1310 and the media renderer 1312, respectively. In an exemplary implementation the certificates may be transmitted in the optional UPnP PrepareForConnection message. The media renderer 1312 fetches the content using HTTPS GET (as opposed to HTTP Get). This will invoke mutual authentication of the media server 1310 and the media renderer 1312, as described above. Since both sides have valid certificates no user interaction is required. The certificate may contain an expiration date and time that allow access for a limited period of time.

Following successful TLS authentication a secure, i.e. encrypted channel, is established between the media server 1310 and the media renderer 1312. Due to the high data rate and the processing required for encryption hardware encryption may be necessary.

An Exemplary Operating Environment

Figure 12:
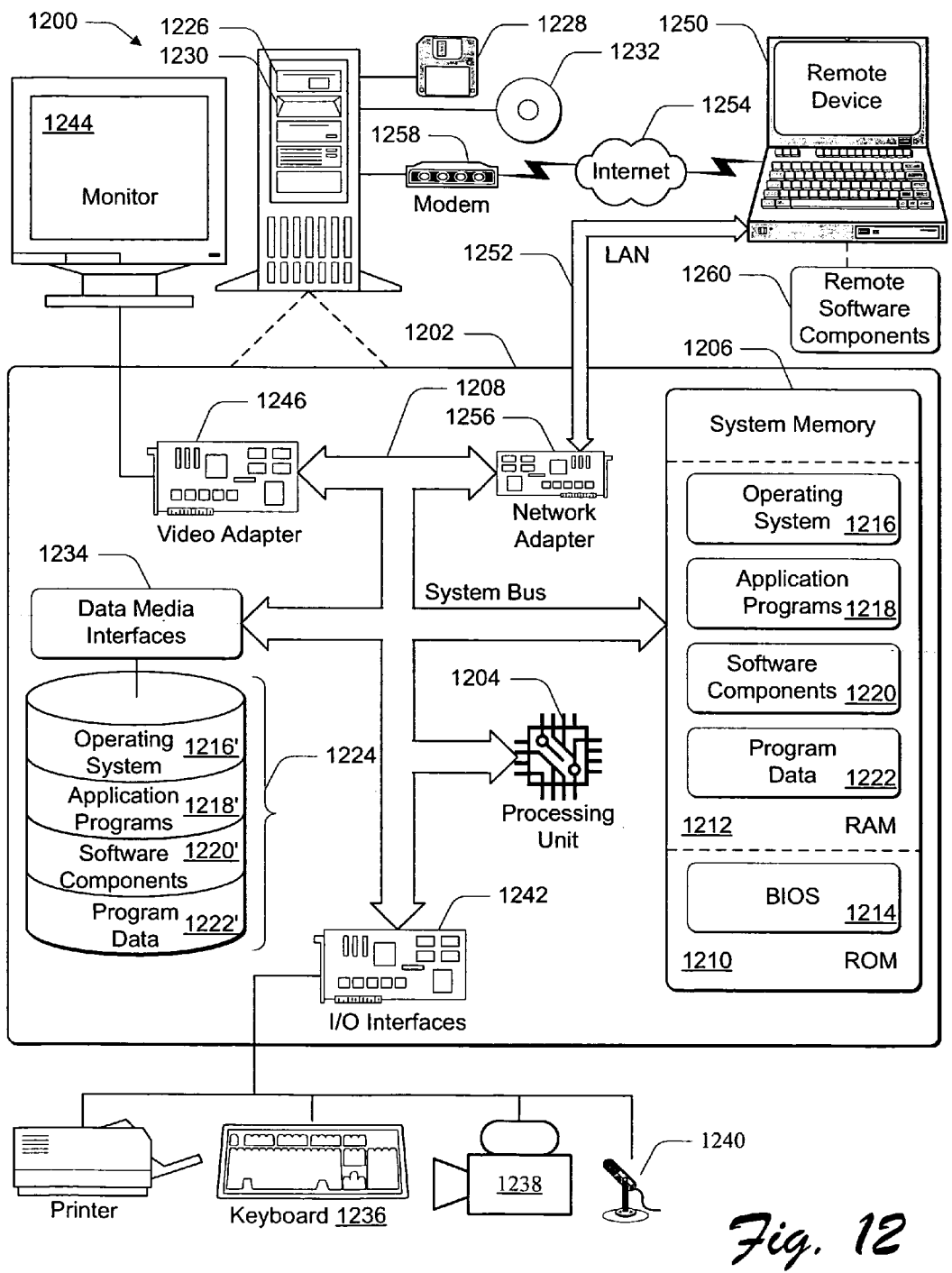
FIG. 12 is a schematic illustration of an exemplary operating environment in which a control point may be implanted.

The operations described above may be implemented as logic instructions executable on a suitable computer processor. In an exemplary implementation the UPnP control point may be implemented on a personal computer. FIG. 12 illustrates an exemplary computing environment suitable for implementing a UPnP control point. Although one specific configuration is shown, a UPnP control point be implemented in other computing configurations.

The computing environment 1200 includes a general-purpose computing system in the form of a computer 1202. The components of computer 1202 can include, but are not limited to, one or more processors or processing units 1204, a system memory 1206, and a system bus 1208 that couples various system components including the processor 1204 to the system memory 1206.

The system bus 1208 represents one or more of any of several types of bus structures, including a memory bus or memory controller, a peripheral bus, an accelerated graphics port, and a processor or local bus using any of a variety of bus architectures. An example of a system bus 1208 would be a Peripheral Component Interconnects (PCI) bus, also known as a Mezzanine bus.

Computer 1202 typically includes a variety of computer readable media. Such media can be any available media that is accessible by computer 1202 and includes both volatile and non-volatile media, removable and non-removable media. The system memory 1206 includes computer readable media in the form of volatile memory, such as random access memory (RAM) 1210, and/or non-volatile memory, such as read only memory (ROM) 1212. A basic input/output system (BIOS) 1214, containing the basic routines that help to transfer information between elements within computer 1202, such as during start-up, is stored in ROM 1212. RAM 1210 typically contains data and/or program modules that are immediately accessible to and/or presently operated on by the processing unit 1204.

Computer 1202 can also include other removable/non-removable, volatile/non-volatile computer storage media. By way of example, FIG. 12 illustrates a hard disk drive 1216 for reading from and writing to a non-removable, non-volatile magnetic media (not shown), a magnetic disk drive 1218 for reading from and writing to a removable, non-volatile magnetic disk 1220 (e.g., a "floppy disk"), and an optical disk drive 1222 for reading from and/or writing to a removable, non-volatile optical disk 1224 such as a CD-ROM, DVD-ROM, or other optical media. The hard disk drive 1216, magnetic disk drive 1218, and optical disk drive 1222 are each connected to the system bus 1208 by one or more data media interfaces 1226. Alternatively, the hard disk drive 1216, magnetic disk drive 1218, and optical disk drive 1222 can be connected to the system bus 1208 by a SCSI interface (not shown).

The disk drives and their associated computer-readable media provide non-volatile storage of computer readable instructions, data structures, program modules, and other data for computer 1202. Although the example illustrates a hard disk 1216, a removable magnetic disk 1220, and a removable optical disk 1224, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1216, magnetic disk 1220, optical disk 1224, ROM 1212, and/or RAM 1210, including by way of example, an operating system 1226, one or more application programs 1228, other program modules 1230, and program data 1232. Each of such operating system 1226, one or more application programs 1228, other program modules 1230, and program data 1232 (or some combination thereof) may include an embodiment of a caching scheme for user network access information.

Computer 1202 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1202 via input devices such as a keyboard 1234 and a pointing device 1236 (e.g., a "mouse"). Other input devices 1238 (not shown specifically) may include a microphone, joystick, game pad, satellite dish, serial port, scanner, and/or the like. These and other input devices are connected to the processing unit 1204 via input/output interfaces 1240 that are coupled to the system bus 1208, but may be connected by other interface and bus structures, such as a parallel port, game port, or a universal serial bus (USB).

A monitor 1242 or other type of display device can also be connected to the system bus 1208 via an interface, such as a video adapter 1244. In addition to the monitor 1242, other output peripheral devices can include components such as speakers (not shown) and a printer 1246 which can be connected to computer 1202 via the input/output interfaces 1240.

Computer 1202 can operate in a networked environment using logical connections to one or more remote computers, such as a remote computing device 1248. By way of example, the remote computing device 1248 can be a personal computer, portable computer, a server, a router, a network computer, a peer device or other common network node, and the like. The remote computing device 1248 is illustrated as a portable computer that can include many or all of the elements and features described herein relative to computer system 1202.

Logical connections between computer 1202 and the remote computer 1248 are depicted as a local area network (LAN) 1250 and a general wide area network (WAN) 1252. Such networking environments are commonplace in offices, enterprise-wide computer networks, intranets, and the Internet. When implemented in a LAN networking environment, the computer 1202 is connected to a local network 1250 via a network interface or adapter 1254. When implemented in a WAN networking environment, the computer 1202 typically includes a modem 1256 or other means for establishing communications over the wide network 1252. The modem 1256, which can be internal or external to computer 1202, can be connected to the system bus 1208 via the input/output interfaces 1240 or other appropriate mechanisms. It is to be appreciated that the illustrated network connections are exemplary and that other means of establishing communication link(s) between the computers 1202 and 1248 can be employed.

In a networked environment, such as that illustrated with computing environment 1200, program modules depicted relative to the computer 1202, or portions thereof, may be stored in a remote memory storage device. By way of example, remote application programs 1258 reside on a memory device of remote computer 1248. For purposes of illustration, application programs and other executable program components, such as the operating system, are illustrated herein as discrete blocks, although it is recognized that such programs and components reside at various times in different storage components of the computer system 1202, and are executed by the data processor(s) of the computer.

CONCLUSION

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method of adding a device to a Universal Plug and Play (UPnP) network, the device being a UPnP device, comprising:
    retrieving, at a control point in the UPnP network, a device description associated with the device;
    invoking by using a UPnP application programming interface (API), at the control point, a first authentication process to authenticate the device with the control point;
    retrieving, at the control point, a service description associated with the device; and
    retrieving, at the control point, a presentation page associated with the device,
    wherein the first authentication process comprises:
        receiving a device certificate from the device;
        authenticating the device using the device certificate; and
        sending a certificate from the control point to the device, the certificate suitable for the device to authenticate the control point.

2. The method of claim 1, wherein upon connection to the UPnP network the device multicasts information about itself to a predetermined address.

3. The method of claim 2, wherein the control point uses the information multicast by the device to retrieve the device description.

4. The method of claim 1, wherein the first authentication process further comprises:
    using the certificate at the device to authenticate the control point with the device.

5. The method of claim 4, wherein sending the certificate from the control point to the device comprises:
    loading the certificate onto a memory module; and
    transferring the certificate from the control point to the device on the memory module.

6. The method of claim 1, wherein the certificate includes a public key associated with the device.

7. The method of claim 1, wherein the certificate is issued by a certificate authority and includes a public key associated with the certificate authority.

8. The method of claim 1, wherein the device invokes a second authentication process to authenticate the control point with the device.

9. The method of claim 8, wherein the second authentication process comprises transmitting a PIN/password from the control point to the device.

10. The method of claim 9, wherein the PIN/password comprises:
    a credential; and
    a hash of a certificate sent from the device to the control point.

11. A method of adding a control point to a Universal Plug and Play (UPnP) network, comprising:
    transmitting a search request multicast from the control point to a predetermined network address;
    receiving a response to the multicast from at least one device in the UPnP network, the device being a UPnP device, wherein the response includes an indicator requesting a secure communication between the device and the control point;
    invoking by using a UPnP application programming interface (API), at the control point, a first authentication process to authenticate the device with the control point;
    retrieving, at the control point, a device description associated with the device
    retrieving, at the control point, a service description associated with the device; and
    retrieving, at the control point, a presentation page associated with the device,
    wherein the first authentication process comprises:
        receiving a device certificate from the device, and
        authenticating the device using the device certificate, and
        sending a certificate from the control point to the device, the certificate suitable for the device to authenticate the control point.

12. The method of claim 11, wherein the first authentication process further comprises:
    using the certificate at the device to authenticate the control point with the device.

13. The method of claim 12, wherein sending the certificate from the control point to the device comprises:
    loading the certificate onto a memory module; and
    transferring the certificate from the control point to the device on the memory module.

14. The method of claim 11, wherein the certificate includes a public key associated with the device.

15. The method of claim 14, wherein the second authentication process comprises transmitting a PIN/password from the control point to the device.

16. The method of claim 15, wherein the PIN/password comprises:
    a credential; and
    a hash of a certificate sent from the device to the control point.

17. The method of claim 11, wherein the certificate is issued by a certificate authority and includes a public key associated with the certificate authority.

18. The method of claim 11, wherein the device invokes a second authentication process to authenticate the control point with the device.

* * * * *